US008832697B2

(12) United States Patent
Wong et al.

(10) Patent No.: US 8,832,697 B2
(45) Date of Patent: Sep. 9, 2014

(54) PARALLEL FILESYSTEM TRAVERSAL FOR TRANSPARENT MIRRORING OF DIRECTORIES AND FILES

(75) Inventors: Chi Ming Wong, San Francisco, CA (US); Anand Iyengar, Mountain View, CA (US); Panagiotis Tsirigotis, Sunnyvale, CA (US); Thomas K. Wong, Pleasanton, CA (US); Tadd Ottman, Hayward, CA (US); Gaurav Gupta, Mountain View, CA (US); Lalitha Krishnan, Santa Clara, CA (US); Richard A. Simpkins, Mountain View, CA (US)

(73) Assignee: Cisco Technology, Inc., San Jose, CA (US)

( * ) Notice: Subject to any disclaimer, the term of this patent is extended or adjusted under 35 U.S.C. 154(b) by 1902 days.

(21) Appl. No.: 11/478,998

(22) Filed: Jun. 29, 2006

(65) Prior Publication Data

US 2007/0024919 A1 Feb. 1, 2007

Related U.S. Application Data

(60) Provisional application No. 60/695,559, filed on Jun. 29, 2005.

(51) Int. Cl.
| G06F 9/46 | (2006.01) |
| G06F 9/50 | (2006.01) |
| G06F 11/16 | (2006.01) |
| G06F 17/30 | (2006.01) |
| G06F 11/20 | (2006.01) |

(52) U.S. Cl.
CPC ...... *G06F 17/30067* (2013.01); *G06F 11/2094* (2013.01); *G06F 9/5038* (2013.01); *G06F 9/5027* (2013.01); *G06F 11/1662* (2013.01)

USPC .............. 718/102; 718/1; 707/610; 707/639; 707/659; 707/660; 707/764

(58) Field of Classification Search
None
See application file for complete search history.

(56) References Cited

U.S. PATENT DOCUMENTS 5,465,335 A * 11/1995 Anderson ...................... 718/107
5,689,701 A   11/1997 Ault et al.
(Continued)

FOREIGN PATENT DOCUMENTS

| EP | 0 108 338 A2 | 5/1984 |
| EP | 0 926 585 | 6/1999 |

(Continued)

OTHER PUBLICATIONS

Bright et al. A scalable Architecture for Clustered Network Attached Storage, IEEE/NASA MSST2003, Apr. 7-10.

(Continued)

*Primary Examiner* — Emerson Puente
*Assistant Examiner* — Hiren Patel (57) ABSTRACT

A system and method for parallel file system traversal using multiple job executors is disclosed. The system includes a pool of job executors, a job queue, and a trigger tracker. An object, representative of a node in the filesystem, is added (i.e., pushed) to the job queue for processing by an job executor. The job queue assigns (i.e., pops) objects to job executors in accordance to a LIFO (Last In First Out) ordering. Then the job executor performs an action such as copy. In one embodiment, the trigger tracker follows the processing of a child nodes to a particular child node. Thus, the filesystem is being traversed by several job executors at the same time.

26 Claims, 8 Drawing Sheets

(56) References Cited

U.S. PATENT DOCUMENTS

| | | | |
|---|---|---|---|
| 5,774,715 A | 6/1998 | Madany et al. | |
| 5,832,261 A * | 11/1998 | Ishizaka et al. | 718/100 |
| 5,890,169 A | 3/1999 | Wong et al. | |
| 5,933,825 A | 8/1999 | McClaughry et al. | |
| 5,951,656 A * | 9/1999 | Finnell | 710/54 |
| 6,070,254 A | 5/2000 | Pratt et al. | |
| 6,101,508 A | 8/2000 | Wolff | |
| 6,192,408 B1 | 2/2001 | Vahalia et al. | |
| 6,314,460 B1 | 11/2001 | Knight et al. | |
| 6,341,302 B1 * | 1/2002 | Celis | 718/100 |
| 6,353,837 B1 | 3/2002 | Blumenau | |
| 6,389,427 B1 | 5/2002 | Faulkner | |
| 6,408,298 B1 | 6/2002 | Van et al. | |
| 6,442,548 B1 | 8/2002 | Balabine et al. | |
| 6,453,354 B1 | 9/2002 | Jiang et al. | |
| 6,473,401 B1 | 10/2002 | Kong et al. | |
| 6,606,690 B2 | 8/2003 | Padovano | |
| 6,615,365 B1 | 9/2003 | Jenevein et al. | |
| 6,633,887 B2 | 10/2003 | Suzuki et al. | |
| 6,694,431 B1 | 2/2004 | Binding et al. | |
| 6,697,846 B1 | 2/2004 | Soltis | |
| 6,711,625 B1 | 3/2004 | Simpson | |
| 6,738,883 B2 | 5/2004 | March et al. | |
| 6,931,410 B2 | 8/2005 | Anderson et al. | |
| 6,938,039 B1 * | 8/2005 | Bober et al. | 707/704 |
| 6,983,379 B1 | 1/2006 | Spalink et al. | |
| 6,985,956 B2 | 1/2006 | Luke et al. | |
| 6,996,714 B1 | 2/2006 | Halasz et al. | |
| 7,054,927 B2 * | 5/2006 | Ulrich et al. | 709/223 |
| 7,072,917 B2 | 7/2006 | Wong et al. | |
| 7,089,293 B2 | 8/2006 | Grosner et al. | |
| 7,092,976 B2 * | 8/2006 | Curran et al. | 1/1 |
| 7,096,253 B2 | 8/2006 | Vinson et al. | |
| 7,103,628 B2 * | 9/2006 | Neiman et al. | 709/201 |
| 7,120,666 B2 | 10/2006 | McCanne et al. | |
| 7,127,477 B2 | 10/2006 | Duncombe et al. | |
| 7,225,210 B2 * | 5/2007 | Guthrie, II. | 1/1 |
| 7,237,027 B1 | 6/2007 | Raccah et al. | |
| 7,254,636 B1 | 8/2007 | O'Toole et al. | |
| 7,272,613 B2 | 9/2007 | Sim et al. | |
| 7,272,654 B1 | 9/2007 | Brendel | |
| 7,308,473 B1 | 12/2007 | Thomas et al. | |
| 7,308,709 B1 | 12/2007 | Brezak et al. | |
| 7,313,579 B2 | 12/2007 | Murotani | |
| 7,324,995 B2 * | 1/2008 | Findleton et al. | 1/1 |
| 7,346,664 B2 * | 3/2008 | Wong et al. | 709/214 |
| 7,386,610 B1 * | 6/2008 | Vekiarides | 709/224 |
| 7,441,011 B2 | 10/2008 | Lin et al. | |
| 7,475,142 B2 | 1/2009 | Sharma et al. | |
| 7,512,673 B2 | 3/2009 | Miloushev et al. | |
| 7,562,110 B2 | 7/2009 | Miloushev et al. | |
| 7,567,991 B2 * | 7/2009 | Armangau et al. | 1/1 |
| 7,587,422 B2 * | 9/2009 | Wong et al. | 1/1 |
| 7,587,471 B2 | 9/2009 | Yasuda et al. | |
| 7,720,796 B2 | 5/2010 | Wong et al. | |
| 7,831,641 B2 * | 11/2010 | Wong et al. | 707/822 |
| 7,844,646 B1 * | 11/2010 | Deshmukh et al. | 707/825 |
| 8,131,689 B2 | 3/2012 | Tsirigotis et al. | |
| 8,180,843 B2 | 5/2012 | Wong et al. | |
| 8,190,741 B2 | 5/2012 | Wong et al. | |
| 8,195,627 B2 | 6/2012 | Wong et al. | |
| 8,539,081 B2 | 9/2013 | Iyengar et al. | |
| 2002/0013832 A1 | 1/2002 | Hubbard | |
| 2002/0111929 A1 | 8/2002 | Pudipeddi et al. | |
| 2002/0120763 A1 | 8/2002 | Milosuhev et al. | |
| 2002/0133491 A1 | 9/2002 | Sim et al. | |
| 2002/0154645 A1 | 10/2002 | Hu et al. | |
| 2002/0161855 A1 | 10/2002 | Manczak et al. | |
| 2002/0184244 A1 | 12/2002 | Hsiao et al. | |
| 2002/0199060 A1 | 12/2002 | Peters et al. | |
| 2003/0037061 A1 | 2/2003 | Sastri et al. | |
| 2003/0046270 A1 | 3/2003 | Leung et al. | |
| 2003/0046335 A1 | 3/2003 | Doyle et al. | |
| 2003/0056112 A1 | 3/2003 | Vinson et al. | |
| 2003/0110263 A1 | 6/2003 | Shillo | |
| 2003/0120948 A1 | 6/2003 | Schmidt et al. | |
| 2003/0126247 A1 | 7/2003 | Strasser et al. | |
| 2003/0140051 A1 | 7/2003 | Fujiwara et al. | |
| 2003/0154236 A1 | 8/2003 | Dar et al. | |
| 2003/0177178 A1 | 9/2003 | Jones et al. | |
| 2003/0182313 A1 | 9/2003 | Federwisch et al. | |
| 2003/0195903 A1 | 10/2003 | Manley et al. | |
| 2003/0204613 A1 | 10/2003 | Hudson et al. | |
| 2003/0204670 A1 | 10/2003 | Holt et al. | |
| 2003/0217119 A1 * | 11/2003 | Raman et al. | 709/219 |
| 2003/0220899 A1 | 11/2003 | Numanoi et al. | |
| 2003/0220985 A1 | 11/2003 | Kawamoto et al. | |
| 2004/0010714 A1 | 1/2004 | Stewart | |
| 2004/0024963 A1 | 2/2004 | Talagala et al. | |
| 2004/0054748 A1 | 3/2004 | Ackaouy et al. | |
| 2004/0068575 A1 * | 4/2004 | Cruise | 709/232 |
| 2004/0078465 A1 | 4/2004 | Coates et al. | |
| 2004/0088297 A1 | 5/2004 | Coates et al. | |
| 2004/0103104 A1 | 5/2004 | Hara et al. | |
| 2004/0117438 A1 | 6/2004 | Considine et al. | |
| 2004/0133577 A1 | 7/2004 | Miloushev et al. | |
| 2004/0133606 A1 | 7/2004 | Miloushev et al. | |
| 2004/0133650 A1 | 7/2004 | Miloushev et al. | |
| 2004/0133652 A1 | 7/2004 | Miloushev et al. | |
| 2004/0139167 A1 | 7/2004 | Edsall et al. | |
| 2004/0153481 A1 | 8/2004 | Talluri | |
| 2004/0186849 A1 | 9/2004 | Enko et al. | |
| 2004/0267752 A1 * | 12/2004 | Wong et al. | 707/9 |
| 2004/0267831 A1 | 12/2004 | Wong et al. | |
| 2005/0033932 A1 | 2/2005 | Pudipeddi et al. | |
| 2005/0055402 A1 | 3/2005 | Sato | |
| 2005/0080981 A1 | 4/2005 | Archambault et al. | |
| 2005/0125503 A1 | 6/2005 | Iyengar et al. | |
| 2005/0188211 A1 | 8/2005 | Scott et al. | |
| 2005/0198062 A1 | 9/2005 | Shapiro | |
| 2005/0262102 A1 | 11/2005 | Anderson et al. | |
| 2006/0080371 A1 | 4/2006 | Wong et al. | |
| 2006/0129627 A1 | 6/2006 | Phillips et al. | |
| 2006/0161746 A1 | 7/2006 | Wong et al. | |
| 2006/0253501 A1 * | 11/2006 | Langan et al. | 707/201 |
| 2006/0271598 A1 | 11/2006 | Wong et al. | |
| 2006/0282498 A1 * | 12/2006 | Muro | 709/203 |
| 2007/0074207 A1 * | 3/2007 | Bates et al. | 718/1 |
| 2007/0136308 A1 | 6/2007 | Tsirigotis et al. | |
| 2008/0114854 A1 | 5/2008 | Wong et al. | |

FOREIGN PATENT DOCUMENTS

| | | |
|---|---|---|
| EP | 1 209 556 | 5/2002 |
| EP | 1 311 122 A2 | 5/2003 |
| EP | 1 396 789 A2 | 3/2004 |
| JP | HEI 4-113432 A | 4/1992 |
| JP | HEI 04-299747 | 10/1992 |
| JP | HEI 10-247155 | 9/1998 |
| JP | 2001-075843 | 3/2001 |
| JP | 2004-054607 | 2/2004 |
| JP | 2004-110290 | 4/2004 |
| JP | 2005/502096 | 1/2005 |
| WO | 2004/097686 | 4/2004 |
| WO | WO 2004/053677 | 6/2004 |
| WO | 2004/097571 | 11/2004 |
| WO | 2004/097572 | 11/2004 |
| WO | 2004/097624 | 11/2004 |
| WO | 2005/029251 | 3/2005 |
| WO | 2006/039689 | 4/2006 |
| WO | WO 2006/080371 | 8/2006 |
| WO | 2007/041456 | 10/2006 |
| WO | 2007/002855 | 1/2007 |

OTHER PUBLICATIONS

Leveraging the Benefits of the EMC CLARiiON IP4700 NFS with the Oracle8i Database, an Engineering White Paper, Mar. 5, 2002, EMC Corporation.

Anderson et al., Interposed Request for Scalable Network Storage, ACM Transactions on Computer Systems, vol. 20, No. 1, Feb. 2002.

Jonathan Goldick, Retry of extending networking design notes, PSC, Carnegie-Mellon Univeristy, Feb. 1995.

U.S. Appl. No. 60/478,154, filed Apr. 24, 2003.

(56) References Cited

OTHER PUBLICATIONS

Office Action mailed Jan. 3, 2007 for U.S. Appl. No. 10/832,785.
Final Office Action mailed Aug. 31, 2007 for U.S. Appl. No. 10/832,785.
Office Action, U.S. Appl. No. 10/832,785, mailed May 28, 2008.
Final Office Action mailed Jan. 5, 2009 for U.S. Appl. No. 10/832,785.
Office Action, U.S. Appl. No. 10/832,785, mailed Jun. 8, 2009.
U.S. Appl. No. 60/465,578 filed Apr. 24, 2003.
Office Action mailed Dec. 18, 2006 for U.S. Appl. No. 10/831,701.
Final Office Action mailed Sep. 12, 2007, for U.S. Appl. No. 10/831,701.
Office Action, U.S. Appl. No. 10/831,701, mailed Jun. 25, 2008.
Final Office Action, U.S. Appl. No. 10/831,701, mailed Jan. 5, 2009.
Notice of Allowance, U.S. Appl. No. 10/831,701, mailed May 14, 2009.
Allowed Claims, U.S. Appl. No. 10/831,701.
Office Action mailed Jan. 11, 2008, for U.S. Appl. No. 11/324,845.
Final Office Action, U.S. Appl. No. 11/324,845, mailed Sep. 5, 2008.
Office Action mailed Feb. 9, 2009, for U.S. Appl. No. 11/324,845.
Notice of Allowance mailed Sep. 21, 2009, for U.S. Appl. No. 11/324,845.
Notice of Allowance mailed Dec. 2, 2009, for U.S. Appl. No. 11/324,845.
U.S. Appl. No. 60/465,579, filed Apr. 24, 2003.
Office Action mailed Mar. 23, 2007, for U.S. Appl. No. 10/831,376.
Final Office Action mailed Aug. 10, 2007, for U.S. Appl. No. 10/831,376.
Notice of Allowance mailed Oct. 22, 2007, for U.S. Appl. No. 10/831,376.
Allowed Claims, U.S. Appl. No. 10/831,376.
Office Action, U.S. Appl. No. 11/241,554, mailed Aug. 8, 2007.
Final Office Action, U.S. Appl. No. 11/241,554, mailed Jul. 25, 2008.
Office Action, U.S. Appl. No. 11/241,554, mailed Jan. 8, 2009.
Final Office Action, U.S. Appl. No. 11/241,554, mailed Aug. 19, 2009.
Examiner Interview, U.S. Appl. No. 11/241,554, mailed Sep. 30, 2009.
Office Action, U.S. Appl. No. 11/395,118, mailed Jun. 10, 2009.
Office Action, U.S. Appl. No. 11/537,997, mailed Sep. 25, 2009.
U.S. Appl. No. 60/465,580, filed Apr. 24, 2003.
Office Action mailed Feb. 3, 2005 for U.S. Appl. No. 10/832,927.
Office Action mailed Jun. 22, 2005 for U.S. Appl. No. 10/832,927.
Notice of Allowance mailed Feb. 9, 2006 for U.S. Appl. No. 10/832,927.
Allowed Claims, U.S. Appl. No. 10/832,927.
U.S. Appl. No. 60/503,190, filed Sep. 15, 2003.
Non-Final Office Action dated Jan. 8, 2009 for U.S. Appl. No. 10/942,762.
Final Office Action dated Jul. 21, 2009 for U.S. Appl. No. 10/942,762.
U.S. Appl. No. 60/615,002, filed Sep. 30, 2004.
U.S. Appl. No. 60/641,217, filed Dec. 31, 2004.
PCT Int'l Search Report and Written Opinion PCT/US04/12841, dated Oct. 13, 2004.
PCT Search Report and Written Opinion PCT/US04/12846, dated Sep. 28, 2004.
PCT Search Report and Written Opinion PCT/US04/12847 dated Nov. 3, 2004.
International Preliminary Report on Patentability dated Apr. 10, 2008 for PCT Application No. PCT/US2006/038361.
PCT Int'l Search Report and Written Opinion PCT/US04/12844, Mar. 14, 2005, 14 pages.
PCT Int'l Search Report and Written Opinion PCT/US04/30180 dated Mar. 27, 2006.
International Search Report sent Sep. 30, 2008 for PCT Application No. PCT/US05/35624.
Written Opinion sent Sep. 30, 2008 for PCT Application No. PCT/US05/35624.
European Search Report dated Dec. 4, 2008 for EP Patent Application No. 04750678.7.
European Office Action dated Apr. 9, 2009 for EP Patent Application No. 04750678.7.
Chinese Office Action dated Nov. 20, 2009 for CN Patent Application No. 200680032142.X.
PCT International Search Report and Written Opinion, PCT/US06/25430, May 8, 2007, 8 pages.
US Examiner Interview Summary Application dated Mar. 31, 2009 issued in U.S. Appl. No. 11/241,554.
US Office Action dated Feb. 5, 2010 issued in U.S. Appl. No. 11/241,554.
US Office Action Final dated Jul. 21, 2010 issued in U.S. Appl. No. 11/241,554.
US Examiner Interview Summary dated Sep. 14, 2010 issued in U.S. Appl. No. 11/241,554.
US Final Office Action Final dated Feb. 18, 2010 issued in U.S. Appl. No. 11/395,118.
US Office Action dated Mar. 11, 2011 issued in U.S. Appl. No. 11/395,118.
US Office Action dated Apr. 15, 2010 issued in U.S. Appl. No. 11/537,997.
US Office Action (Examiner Interview Summary) dated Jul. 19, 2010 issued in U.S. Appl. No. 11/537,997.
US Office Action dated Sep. 22, 2010 issued in U.S. Appl. No. 12/019,582.
US Office Action dated Feb. 25, 2011 issued in U.S. Appl. No. 12/019,582.
US Office Action Final dated Jan. 15, 2010 issued in U.S. Appl. No. 10/942,762.
US Office Action Final dated Aug. 3, 2010 issued in U.S. Appl. No. 10/942,762.
US Examiner Interview Summary dated Oct. 12, 2010 issued in U.S. Appl. No. 10/942,762.
US Office Action dated Jan. 20, 2011 issued in U.S. Appl. No. 11/478,998.
U.S. Appl. No. 60/667,567, filed Mar. 31, 2005, Wong et al.
U.S. Appl. No. 60/722,465, filed Sep. 30, 2005, Tsirigotis et al.
European Second Office Action dated Feb. 22, 2010 issued in EP Patent Application No. 04 750 678.7-1245.
European Examination Report dated Nov. 9, 2010 issued in 04 750 678.7-1245.
Japanese Office Action dated Dec. 22, 2009 issued in JP Patent Application No. 2006-513342.
PCT International Search Report dated Aug. 29, 2007 issued in PCT/US2006/038361.
PCT International Preliminary Report on Patentability and Written Opinion dated Aug. 29, 2007 issued in PCT/US2006/038361.
European Supplementary Search Report dated Jun. 4, 2010 issued in EP 06 81 5981.
Yamakawa et al., (Aug. 12, 2002) "NAS Switch: Virtualized Integration Techniques of NFS Server", *Engineering Research Report of Institute of Electronics, Information and Communication Engineers published by Institute of Electronics, Information and Communication Engineers,* Japan, 102(275):13-18, only pp. 1-10 are considered, pp. 11-18 are not considered.
US Advisory Action dated Nov. 21, 2007 issued in U.S. Appl. No. 10/832,785.
US Notice of Allowance and Examiner-Initiated Interview Summary dated Dec. 29, 2009 issued in U.S. Appl. No. 10/832,785.
US Notice of Allowance and Examiner-Initiated Interview Summary dated Apr. 21, 2010 issued in U.S. Appl. No. 10/832,785.
US Notice of Allowance and Examiner-Initiated Interview Summary dated Aug. 9, 2010 issued in U.S. Appl. No. 10/832,785.
US Advisory Action dated Nov. 27, 2007 issued in U.S. Appl. No. 10/831,701.
US Advisory Action dated Nov. 21, 2008 issued in U.S. Appl. No. 11/324,845.
US Notice of Allowance dated Mar. 16, 2010 issued in U.S. Appl. No. 11/324,845.
US Notice of Allowance dated Jul. 6, 2011 issued in U.S. Appl. No. 11/241,554.

(56) References Cited

OTHER PUBLICATIONS

US Office Action dated Mar. 31, 2011 issued in U.S. Appl. No. 11/537,997.
US Notice of Allowance dated Jun. 15, 2011 issued in U.S. Appl. No. 12/019,582.
PCT International Preliminary Report on Patentability and Written Opinion dated Jan. 9, 2008 issued in PCT/US2006/25430.
European Extended Search Report, Supplementary Search Report and Search Opinion dated Feb. 25, 2011 issued in EP 06 785 872.0.
Carns et al. (Oct. 1, 2000) "PVFS: A Parallel File System for Linux Clusters", *Proceedings of the 4th Annual Linux Showcase and Conference*, vol. 4, pp. 317-327, XP002532238, USENIX Assoc, Atlanta, Georgia.
Sheth et al., "Data structure distribution and multi-threading of Linux file system for multiprocessors", 5th International Conference on High Performance Computing, 1998 (HIPC '98); Madras, India Dec. 17-20, 1998, IEEE Comput. Soc, US, Dec. 17, 1998, pp. 97-104, XP010317644, DOI: DOI:10.1109/HIPC.1998.737976.
US Office Action Final dated Jul. 29, 2011 issued in U.S. Appl. No. 11/395,118.
US Notice of Allowance dated Aug. 5, 2011 issued in U.S. Appl. No. 11/537,997.
US Notice of Allowance dated Sep. 30, 2011 issued in U.S. Appl. No. 12/019,582.
European Extended Search Report, supplementary European Search Report, and European Search Opinion dated Jul. 26, 2011 issued in EP 05 802 942.2.
Japanese Office Action (Notice of Grounds for Rejection) dated May 10, 2011 issued in JP 2007-534880.
Katsurashima et al (2003) "Design and Evaluation of CIFS Server Virtualization Method", *Technical Research Report (IEICE), The Institute of Electronics Information and Communication Engineers*, 103(248): 73-78.
US Notice of Allowance dated Oct. 28, 2011 issued in U.S. Appl. No. 11/241,554.
US Notice of Allowance dated Feb. 3, 2012 issued in U.S. Appl. No. 11/241,554.
US Notice of Allowance dated Oct. 19, 2011 issued in U.S. Appl. No. 11/395,118.
US Notice of Allowance dated Feb. 3, 2012 issued in U.S. Appl. No. 11/395,118.
US Notice of Allowance dated Nov. 28, 2011 issued in U.S. Appl. No. 11/537,997.
US Notice of Allowance dated Jan. 13, 2012 issued in U.S. Appl. No. 12/019,582.
US Office Action dated Feb. 3, 2012 issued in U.S. Appl. No. 10/942,762.
US Notice of Allowance dated Oct. 4, 2012 issued in U.S. Appl. No. 10/942,762.
US Notice of Allowance dated May 16, 2013 issued in U.S. Appl. No. 10/942,762.
European Summons to attend oral proceedings dated Oct. 6, 2011 issued in EP Patent Application No. 04 750 678.7-1245.
European Result of Consultation dated Feb. 21, 2012 issued in EP Patent Application No. 04 750 678.7-1245.
European Decision to Refuse an application and Minutes of Oral Proceedings dated Feb. 23, 2012 issued in EP Patent Application No. 04 750 678.7-1245.
European Office Action dated Feb. 26, 2013 issued in EP 05 802 942.2.
Japanese Decision of Rejection (Final Rejection) dated Jun. 5, 2012 issued in JP 2007-534880.

\* cited by examiner

Job Queue: F    D
Triggers: Ct→At ←Bt
Workers:

FIG. 8E

Job Queue:     B
Triggers: Ct→At
Workers: F

FIG. 8F

Job Queue: Ct
Triggers: At
Workers:

FIG. 8G

Job Queue: At
Triggers:
Workers:

FIG. 8H

PARALLEL FILESYSTEM TRAVERSAL FOR TRANSPARENT MIRRORING OF DIRECTORIES AND FILES

CROSS-REFERENCE TO RELATED APPLICATIONS

The present application claims priority under 35 USC 119 (e) to U.S. Provisional Patent Application No. 60/695,559 filed on Jun. 29, 2005; and is related to U.S. patent application Ser. No. 10/831,376, filed on Apr. 23, 2004 and 10/831,701, filed on Apr. 23, 2004, the contents of each being hereby incorporated by reference.

FIELD OF THE INVENTION

The present invention relates generally to traversals of filesystems, and more specifically, to using multiple job executors for filesystem traversal.

BACKGROUND

Filesystems are directories that organize and manage access to sub-directories and files stored on a computing device such as a server. For example, a file server can have a filesystem that allows clients to access stored sub-directories and files. In a mirroring operation, a filesystem is copied from one file server to another file server for purposes such as file migration and file replication. To copy the filesystem, a mirroring application traverses the filesystem by visiting each node and performing a copy operation.

However, mirror operations performed over a network can be slow due to, for example, idle time experienced while waiting for the results of a command. More particularly, a command such as read sub-directory can be sent to the filesystem being mirrored. The command is packed according to a network protocol and travels across the network before being unpacked. The receiving device process the command and returns results through the network. During this time, the file traversal process is idle.

What is needed is a system and method for parallel file traversal using multiple job executors.

SUMMARY

To meet the above need, a system and method for parallel file system traversal using multiple job executors is disclosed. The system includes a pool of job executors (e.g., threads), a job queue, and a trigger tracker. An object, representative of a node in the filesystem, is added (i.e., pushed) to the job queue for processing by an job executor. The job queue assigns (i.e., pops) objects to job executors in accordance to a LIFO (Last In First Out) ordering. Then the job executor performs an action such as copy. In one embodiment, the trigger tracker follows the processing of a child nodes to a particular child node. Thus, the filesystem is being traversed by several job executors at the same time.

In one embodiment, a barrier can be added to the job queue to control the parallel processing. For example, in a debugging operations, a program may want only a certain part of a filesystem to be processed.

In another embodiment, the job queue controls parallel processing by adding sets of objects generated by after all of the job executors have returned. In still another embodiment, the job queue controls parallel processing by assigning objects to the job executors without accepting any adds until assignments are completed.

Advantageously, parallel processing increases the speed, and reduces downtime, or the amount of time a file system is subject to mirroring.

One skilled in the art will recognize that these Figures are merely examples of the operation of the invention according to one embodiment and that other configurations and modes of operation can be used without departing from the essential characteristics of the invention.

DETAILED DESCRIPTION

A system and method for parallel traversal of a file system are disclosed. For example, during mirroring operations in applications such as file migration, file replication, or snapshot, multiple job executors (e.g., threads) can be used for parallel file system traversal. Generally, traversal of a filesystem (or directory tree) is a process of visiting each directory and file in the filesystem, and performing some action. The system according to some embodiments of the present invention is set forth in FIGS. 1-3, and methods operating therein, according to some embodiments of the present invention, are set forth in FIGS. 4-8.

Figure 1:
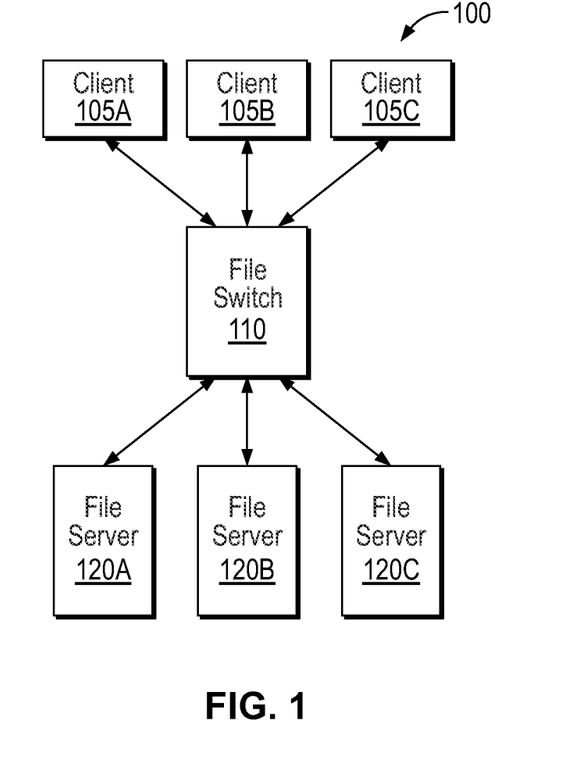
FIG. 1 is a block diagram illustrating a system for parallel traversal of a file system according to one embodiment of the present invention.

FIG. 1 is a block diagram illustrating a system 100 for parallel traversal of a file system according to one embodiment of the present invention. System 200 includes a clients 105A-C, a file switch 110, and file servers 120A-C. The components can be implemented with a personal computer or other processing device capable of communication over a network. Each of the components can be coupled in communication through the network such as a TCP/IP (Transmission Control Protocol/Internet Protocol) data network or a telephone network. In one embodiment, the components of system 100 communicate using NAS (Network Attached Storage) protocols or another decentralized protocol for storage networks. The NAS can be implemented with, for example, CIFS or NFS. At a high-level, file switch 110 provides a transparency for clients 105A-C accessing file servers 120A-C. In providing transparency, file switch 110 allows clients to use a switch file handle, which is persistent, to continuously refer to a file, even though the file may change physical locations on file servers 130A-C.

In one embodiment, clients 105A-C use switch file handles issued by file switch 10 to access files stored on file servers 120A-C. Thus, clients 105A-C are unaware of changes to file locations on the back-end. In one embodiment, file switch 110 tracks changes to file locations using a file handle location table as described below with respect to FIG. 2. An original export share stored in the file handle location table from file servers 120A-C contain NAS file handles that are representative of a file location on corresponding file systems. In turn, the switch file handles are associated with NAS file handles and are issued to clients 105A-C. When a file changes locations on the storage network due to, for example, a file migration operations, the NAS switch handle is updated in the file handle location table. In other embodiments, file switch 110 can provide additional services such as authentication to file servers 120A-C on behalf of clients 105A-C. File servers 120A-C include filesystems, the contents of which are tracked and managed by file switch 110.

Figure 2:
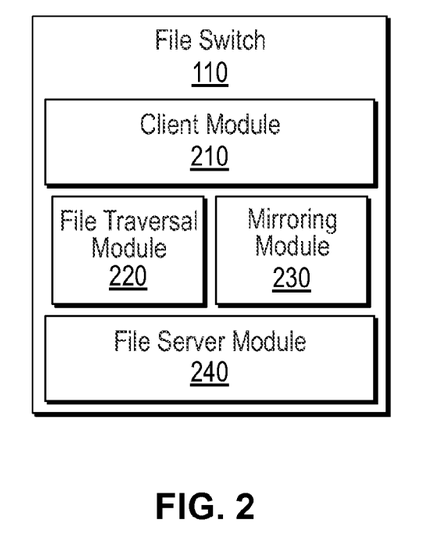
FIG. 2 is a more detailed block diagram of a file switch of FIG. 1 according to one embodiment of the present invention.

FIG. 2 is a more .detailed block diagram of file switch 110 of FIG. 1 according to one embodiment of the present invention. File switch 110 includes a client module 210, a filesystem traversal module 220, a mirror module 230, and a file server module 240.

Client module 210 manages communications with clients 105A-C while file server module 240 manages communications with file servers 120A-C. Mirror module 230 can provide mirroring services to replicate a filesystem from a source file server to a destination file server. In one embodiment, filesystem traversal module 220 manages filesystem traversals during mirroring operations using multiple job executors as described in more detail below with respect to FIG. 3. Because file switch 110 can maintain the availability of the storage network during mirroring, faster processing from multiple job executors reduces the possibility of interruptions to mirroring caused by commands from clients 105A-C.

Figure 3:
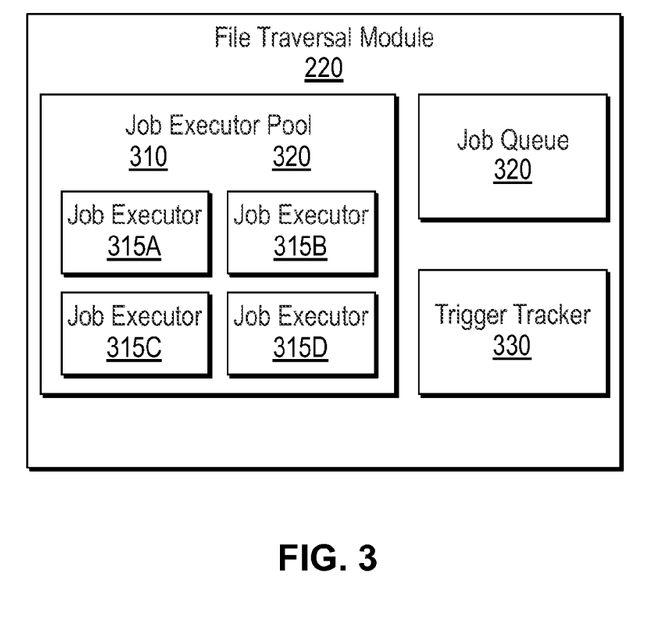
FIG. 3 is a more detailed block diagram of a file traversal module of FIG. 2 according to one embodiment of the present invention.

FIG. 3 is a more detailed block diagram of filesystem traversal module 220 of FIG. 2 according to one embodiment of the present invention. Filesystem traversal module 220 includes a job executor pool 310, a job queue 320, and a trigger tracker 330. Job executor pool 310 is just one embodiment of multiple job executors. An alternative embodiment can be implemented with, for example, a thread pool or a process pool.

Job executor pool 320 includes several job executors 315A-D. Although four job executors 315A-D are shown in the present embodiment, other embodiments can be implemented with, for example, 2, 8 or 64 job executors. Job executors 315A-D can be, for example, hardware logic (e.g., processors or execution units) and/or software instructions. In one embodiment, job executors 315A-D can pop objects from job queue 320. Based on whether the object is a directory, a file, or a trigger, various pre-processing and post-processing actions can be performed. For example, actions can include copying a directory from a source filesystem to a destination filesystem. Pre-processing can be performed before all of the child nodes have been visited, and post-processing can be performed after all of the child nodes have been visited. Specific actions can vary depending on the application making use of filesystem traversals. Moreover, job executors 315A-D can generate objects representative of nodes in a filesystem, and push the objects to job queue 320. In one embodiment, job executors 315A-D operate in parallel since several threads can be operating on several jobs (e.g., one job per thread) at the same time. A single thread can experience latency, due in part to network performance and processing on the file server, while multiple threads can overlap such that the traversal process experiences less idle time. In one embodiment, parallel processing can be enhanced with multiple processor cores, multi-threaded operating systems, and/or inter-process communication.

Job queue 320 can be, for example, a volatile or non-volatile memory device such as a LIFO (Last In First Out) device. Generally, the LIFO device sends out an entry that was most recently added. Job queue 320 can be thread-safe to allow access by multiple threads while remaining consistent. In one embodiment, job queue 320 manages how objects are stored and an order in which objects are dispatched. During push operations, job queue 320 receives and stores objects that represent nodes of the filesystem that need to be processed by job executors 315A-D. In the LIFO embodiment, job queue 320 pops the object from the last set of objects that were pushed. In some embodiments, job queue 320 can be implemented with techniques to control parallel processing with further granularity. For example, a barrier can be added between objects to add a requirement that all objects on one side of the barrier be processed prior to releasing the barrier. In another example, job queue 320 can control pushing and/or pop operations such that job executors 315A-D can only do so once during each round. In other words, an job executor 315A-D that finishes quickly would have to wait until each of the other job executors 315A-D are likewise prepared to push and/or pop.

Trigger tracker 330 can be, for example, a table stored in a memory device. The table can include a list of objects that have triggers, and a count associated with the triggers. Generally, a trigger is created when a particular node in the filesystem has child nodes, and a count is set to the number of child nodes. The parent node is associated with each of the child nodes so that whenever a child node is processed, the count decrements. Once the count reaches zero, the trigger fires, and is added to job queue 320 so that it may be processed. An example of trigger operations is described below in association with FIGS. 8A-H.

Figure 4:
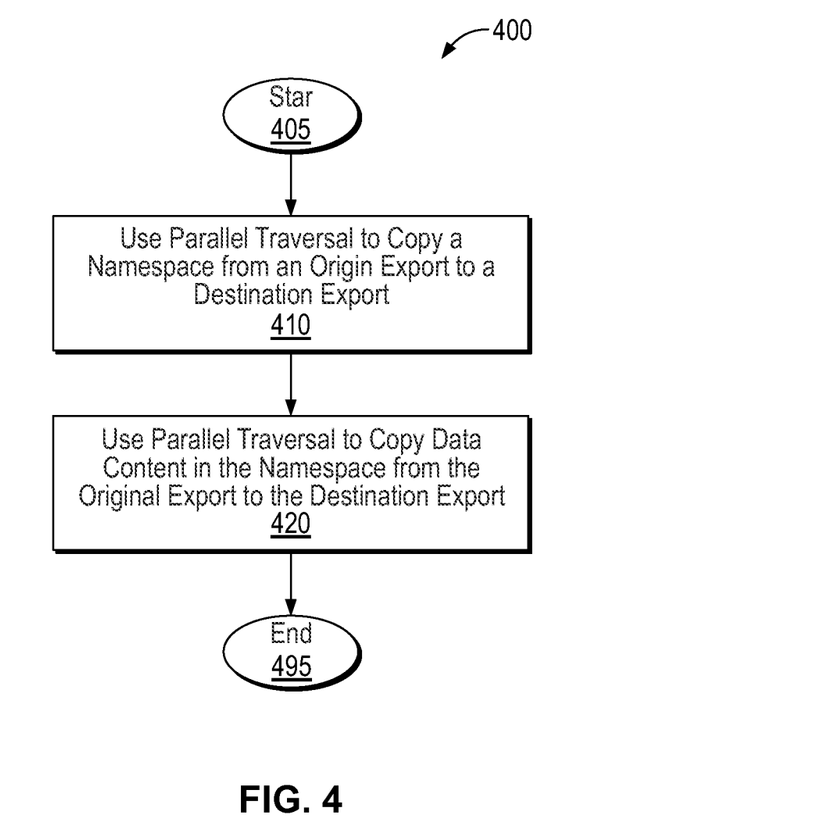
FIG. 4 is a flow diagram of a method for mirroring using parallel file traversal according to one embodiment of the present invention.

FIG. 4 is a flow diagram of a method 400 for mirroring using parallel file traversal according to one embodiment of the present invention. Method 400 can be implemented, for example, in system 100 of FIG. 1. Generally, mirroring is a process in which a filesystem is copied from a source filesystem to a destination filesystem. Applications such as file migration, file replication, and snapshot use mirroring. In one embodiment, as shown in FIG. 4, mirroring is a two step process in which the namespace is copies separately from the data content as described more fully in related U.S. patent applications Ser. Nos. 10/831,376 and 10/831,701 . The two step process can be transparent to the user since the filesystems remain online during mirroring.

More specifically, system 100 uses 410 parallel traversal to copy a namespsace, or the directory structure, from an origin export to a destination export. If no changes have occurred to the namespace during the copying process (e.g., creation or deletion of a sub-directory), then it is committed. Next, system 100 uses 420 parallel traversal to copy data content in the namespace from the origin export to the destination export. Again, if no changes have occurred during copying the data content is committed.

Figure 5:
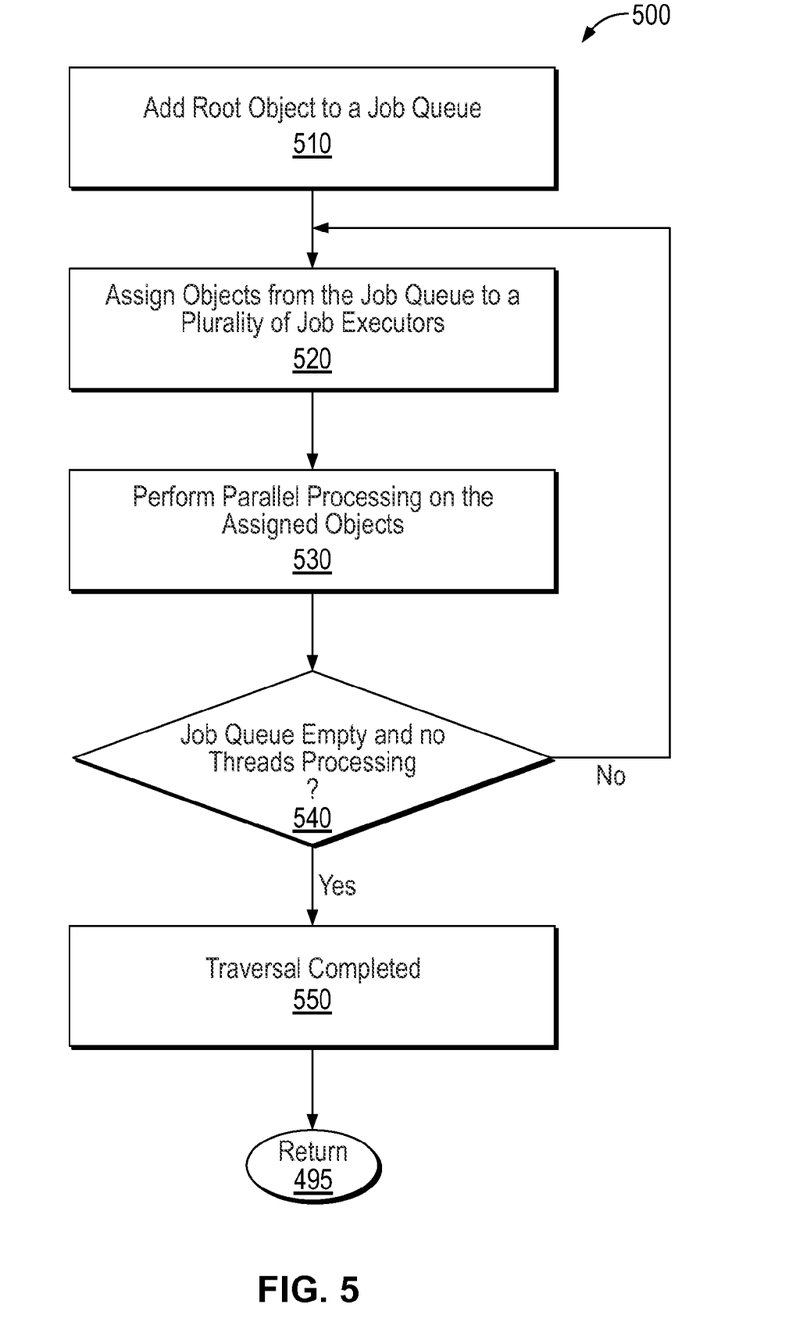
FIG. 5 is a flow diagram of a method for parallel traversal of a filing system according to one embodiment of the present invention.

FIG. 5 is a flow diagram of a method 500 for parallel traversal of a filing system according to one embodiment of the present invention. Method 500 can be implemented by, for example, filesystem traversal module 220.

Filesystem traversal module 220 adds 510 a root object to job queue 320 as its first entry for processing. Job queue 320 assigns 520 objects to a plurality of threads. Because job queue 320 can be thread-safe, it is able to track which threads have been assigned particular objects.

Job executors 315A-D perform 530 parallel processing on the assigned objects as described further below with respect to FIG. 6. Once the job queue 320 is empty and no job executors 315A-D are processing 540, filesystem traversal has been completed. If the mirroring application is performing transparent mirror, as described above, the process will return to method 400. Referring again to FIG. 4, if the filesystem traversal has just finished the first step shown in step 410 proceeds to again perform filesystem traversal as shown in step 410. If step 420 has finished, the process is complete.

In one embodiment, job queue 320 optionally adds control to step 510 and/or step 520. Accordingly, when assigning 520 objects from storage, job queue 320 can wait until all threads are ready and waiting. Alternatively, when performing 520 parallel processing, job queue 320 can wait until all threads have returned before adding. Furthermore, job queue 320 may add objects from threads in a particular order.

Figure 6:
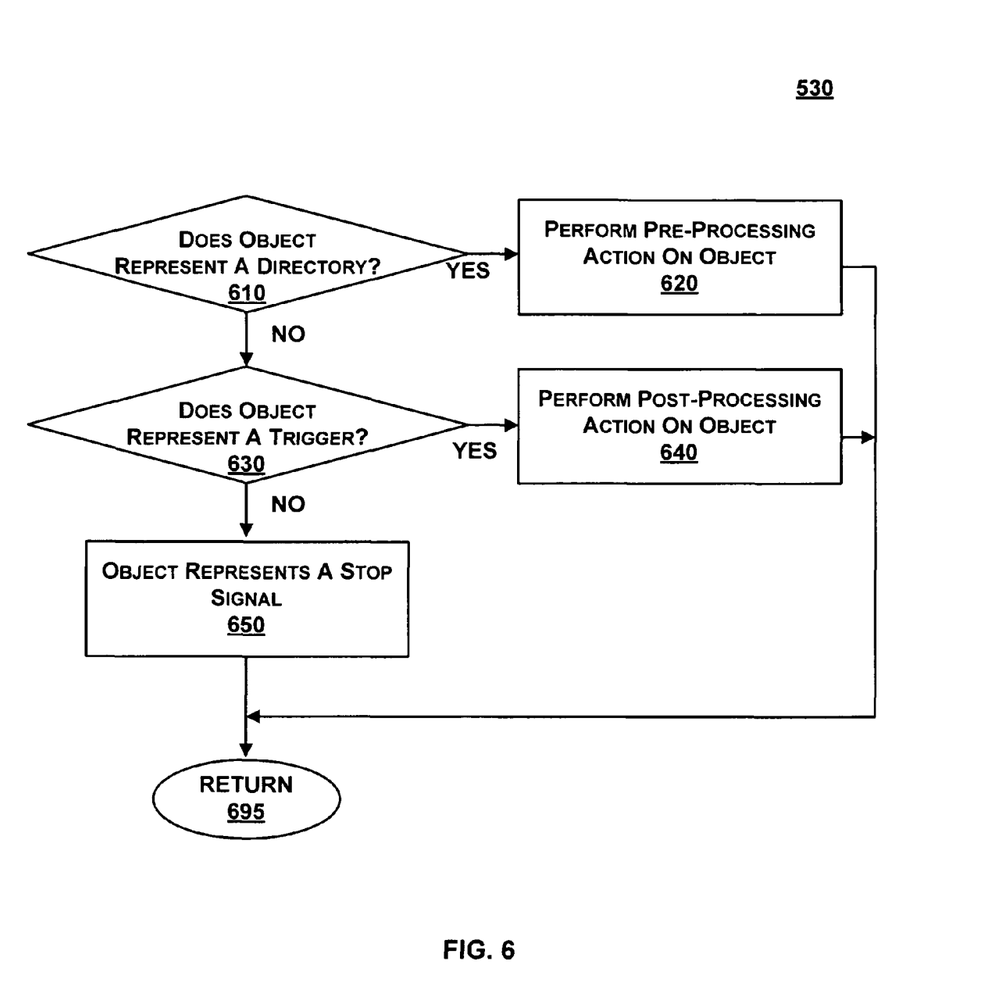
FIG. 6 is a flow diagram of a method for performing parallel processing according to one embodiment of the present invention.

FIG. 6 is a flow diagram of method 530 for performing parallel processing according to one embodiment of the present invention. If the object popped from job queue 320 represents a directory 610 that has child nodes yet to be visited, job executor 315A-D performs 620 a pre-processing action on the object. One embodiment of pre-processing is described below with respect to FIG. 7. In the mirroring application, a sub-directory or file can be copied. If the object popped from job queue 320 represents a trigger 630, then the child nodes have already been visited, and job executor 315A-D optionally performs 640 a post-processing action on the object. Note that in the mirroring process, there is no post-processing action once a copy has been made. However, there may be post processing actions for other processes that should occur after the entire directory has been walked. If the object represents 650 a stop command, the process returns to method 500.

In one embodiment, rather than a stop command, an alternative command can be implemented to control the behavior or parallel filesystem traversal. For example, a barrier can be inserted as a command or object, or command embedded within an object. The barrier can be used to contain processing within a certain portion of the filesystem in an application such as debugging.

Figure 7:
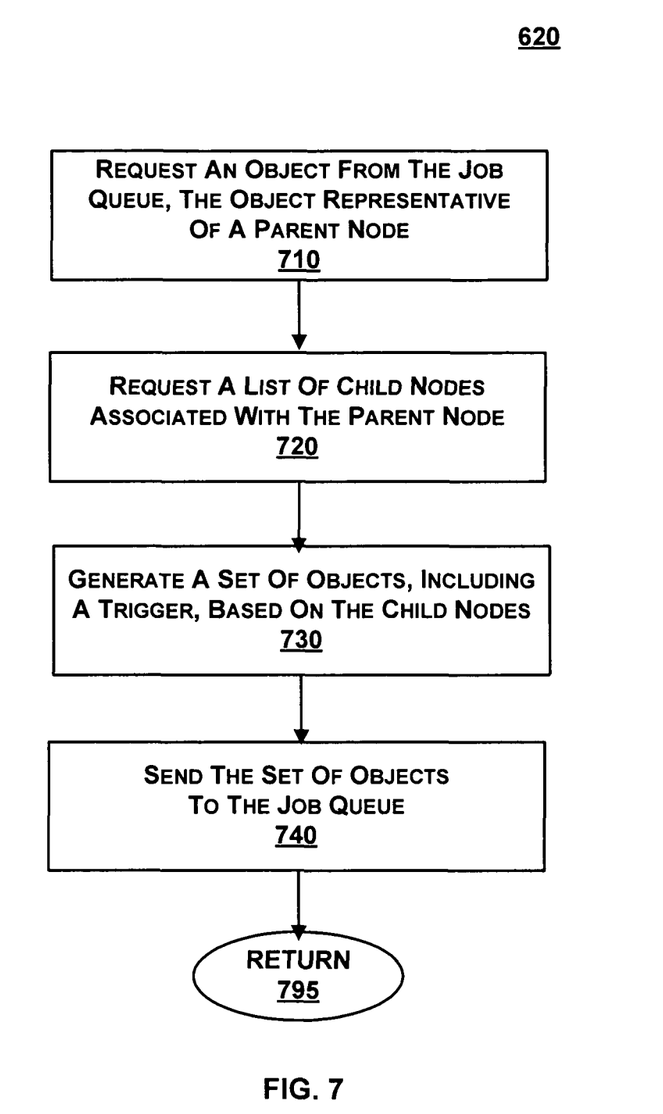
FIG. 7 is a flow diagram of a method for performing a processing action on an object according to one embodiment of the present invention.

FIG. 7 is a flow diagram of method 620 for performing a processing action on an object according to one embodiment of the present invention. Method 620 can be implemented by, for example, job executors 315A-D.

An job executor 315A-D requests 710 an object from job queue 320. A request is sent across the network to an appropriate file server. For example, a read operation for a directory reveals child nodes of a parent node. From the child nodes, job executor 315A-D can generate a set of objects for adding job queue 320, and a trigger with associations for adding to trigger tracker 330. The set of objects is sent 740 to job queue 320, and if needed, to trigger tracker 330.

Figure 8A:
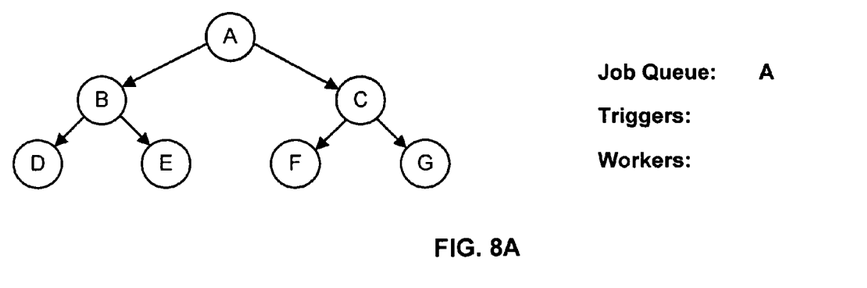
FIGS. 8A-H are schematic diagrams illustrating an example of parallel file traversal according to one embodiment of the present invention.
Figure 8B:
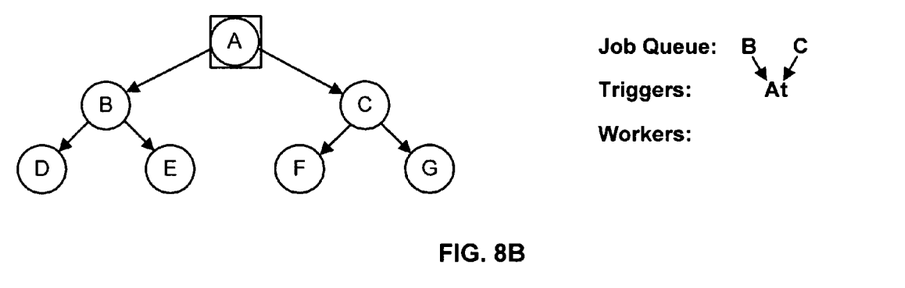

FIGS. 8A-H are schematic diagrams illustrating an example of parallel file traversal according to one embodiment of the present invention. In FIG. 8A, job queue 320 starts with root node A being the only object. In FIG. 8B, an job executor 315A-D pops node A from job queue 320 and invokes a pre-processing action on the node. A trigger for A, At, corresponding to nodes B and C and having a reference count of two, is added to trigger tracker 330 and objects representing nodes B and C are added to job queue 320.

Figure 8C:
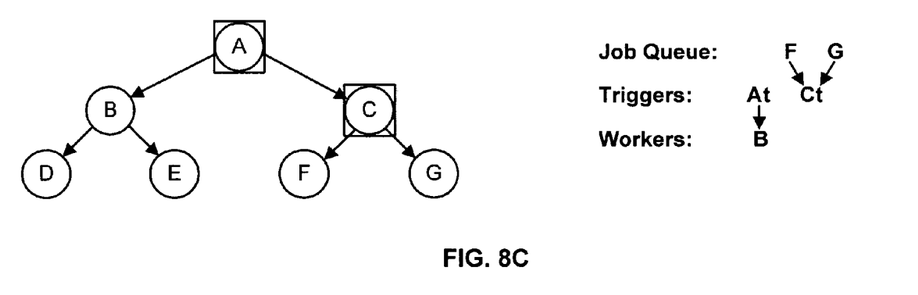
Figure 8D:
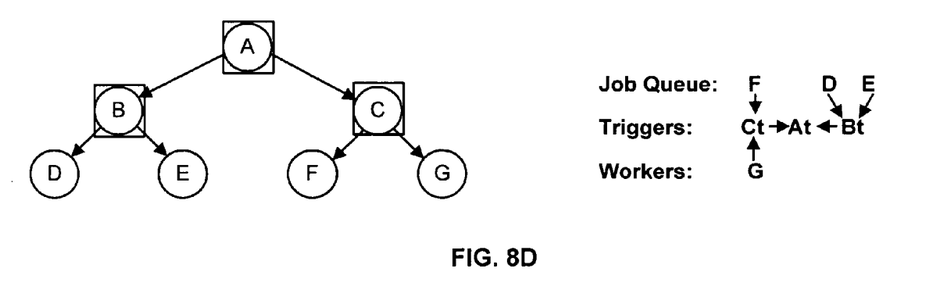

In FIG. 8C, a first job executor 315A-D pops object C from job queue 320 and processes. At the same time, a second job executor 315A-D pops object B from job queue 320 and processes it in parallel with object C. In this example, the second job executor 315A-D finished processing before the first job executor 315A-D, and pushes objects F and G in to job queue 320 first. In FIG. 8D, the second job executor 315A-D pops object G and processes it while the first job executor 315A-D is finishing object B. Once finished, the first job executor 315A-D pops object E, while the second job executor 315A-D processes object G in parallel. Since objects G and E do not have any sub-directories in this example, the first and second job executors 315A-D invoke the post-processing actions on them.

Figure 8E:
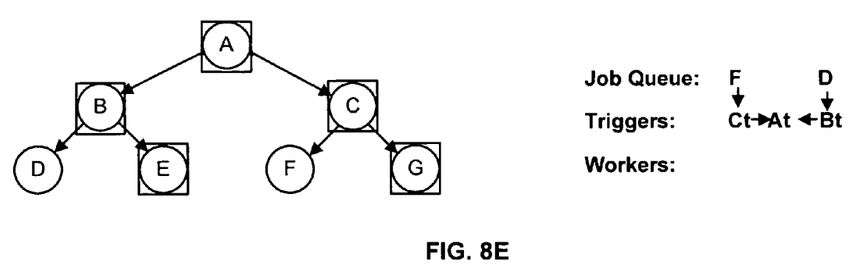
Figure 8F:
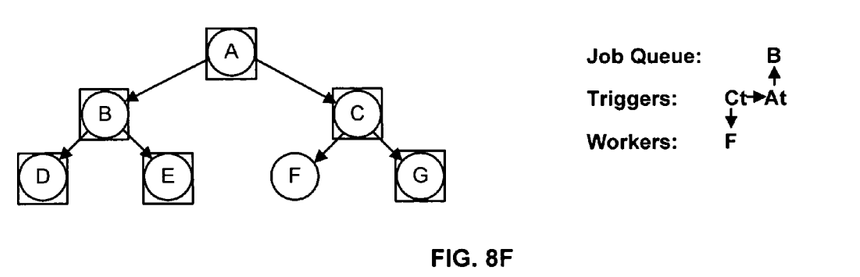

In FIG. 8E, objects D and F are popped and processed in parallel. Object D is completed first. In FIG. 8F, trigger Bt's reference count drops to zero as soon as object D is completed. Then, object B itself is added to job queue 320 for dispatch. The free job executor 315A-D gets object B and invokes a post-processing action. Then nodes F and B are completed.

Figure 8G:
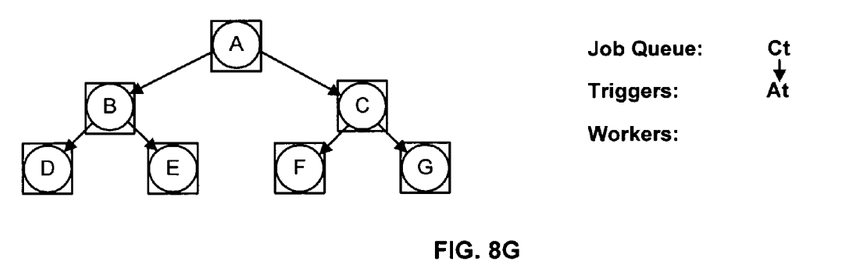
Figure 8H:
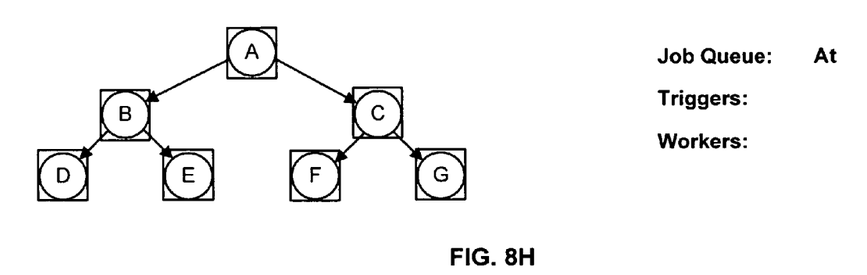

In FIG. 8G, when F is finished, trigger Ct's count drops to zero and node C is added to job queue 320. One of the job executors 315A-D completes C, after which trigger At fires, and node A is added to job queue 320. Finally, in FIG. 8H, node A has a post-processing action performed on it, and the traversal is complete.

In the above description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus can be specially constructed for the required purposes, or it can be a general-purpose computer selectively activated or reconfigured by a computer program stored in the computer. Such a computer program can be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and modules presented herein are not inherently related to any particular computer or other apparatus. Various general-purpose systems can be used with programs in accordance with the teachings herein, or it may prove convenient to construct more specialized apparatuses to perform the method steps. The required structure for a variety of these systems will appear from the description below. In addition, the present invention is not described with reference to any particular programming language. It will be appreciated that a variety of programming languages can be used to implement the teachings of the invention as described herein. Furthermore, as will be apparent to one of ordinary skill in the relevant art, the modules, features, attributes, methodologies, and other aspects of the invention can be implemented as software, hardware, firmware or any combination of the three. Of course, wherever a component of the present invention is implemented as software, the component can be implemented as a standalone program, as part of a larger program, as a plurality of separate programs, as a statically or dynamically linked library, as a kernel loadable module, as a device driver, and/or in every and any other way known now or in the future to those of skill in the art of computer programming. Additionally, the present invention is in no way limited to implementation in any specific operating system or environment.

It will be understood by those skilled in the relevant art that the above-described implementations are merely exemplary, and many changes can be made without departing from the true spirit and scope of the present invention. Therefore, it is intended by the appended claims to cover all such changes and modifications that come within the true spirit and scope of this invention.

What is claimed is:

1. A method for parallel traversal of a file system with a plurality of job executors, the method comprising:
   selecting one or more sets of objects, each of the one or more sets of objects including one or more objects, each of the one or more objects being representative of a child node stemming from at least one of one or more common parent nodes in the file system;
   adding the selected one or more sets of objects to a job queue;
   responsive to adding the one or more sets of objects to the job queue, incrementing a respective one of one or more counts associated with an object in accordance with a number of child nodes associated with a corresponding one of the one or more common parent nodes represented by the object;
   assigning the one or more objects from the one of the one or more sets of objects to the plurality of job executors;
   inserting a barrier between the one or more objects in the job queue, the barrier preventing assignment of an object before the barrier prior to completing operations on each object after the barrier; and
   performing, by the plurality of job executors, parallel actions on the assigned objects, wherein the parallel actions include at least one of replication and migration of data characterizing the assigned objects;
   wherein the plurality of job executors are configured to perform pre-processing on an assigned object when the assigned object has child nodes that have not yet been processed, and to perform post-processing on the assigned object when the assigned object has child nodes that have already been processed.

2. The method of claim 1, wherein completing operations on an object in the job queue comprises performing parallel actions on objects representative of child nodes stemming from another object.

3. The method of claim 1, wherein assigning objects comprises:
   detecting that each of the plurality of job executors is awaiting an assignment from the job queue; and
   assigning the objects from the job queue to the plurality of job executors before adding additional sets of objects to the job queue.

4. The method of claim 1, wherein assigning the objects comprises:
   detecting that each of the plurality of job executors has a set of objects to add to the job queue; and
   adding each set to the job queue before assigning additional objects.

5. The method of claim 1, further comprising:
   requesting information for generating a set of objects through a network.

6. The method of claim 1, wherein performing parallel actions comprises performing parallel actions through a network.

7. The method of claim 1, wherein the parallel actions include replication of nodes represented by the assigned objects.

8. The method of claim 1, wherein the parallel actions are part of one of a namespace replication or a namespace migration.

9. The method of claim 1, wherein the parallel actions are part of a snapshot application.

10. The method of claim 1, wherein the parallel actions are part of a data replication.

11. The method of claim 1, wherein the plurality of job executors comprises a plurality of threads.

12. The method of claim 1, wherein assigning objects from the job queue comprises deleting objects from the job queue.

13. The method of claim 1, further comprising:
   responsive to assigning an object representing one of the child nodes associated with the common parent node to one of the plurality of job executors, decrementing the count.

14. A system for parallel traversal of a file system with a plurality of job executors, the system comprising:
   selection logic configured to select one or more sets of objects, each of the one or more sets of objects including one or more objects, each of the objects being representative of a child node stemming from at least one of one or more common parent nodes in the file system;
   a job queue, coupled to the plurality of job executors, the job queue configured to:
      add the selected one or more sets of objects in the job queue, each of the one or more sets of objects including one or more objects;
      assign the one or more objects from the one of the one or more sets of objects to the plurality of job executors; and insert a barrier between the one or more objects in the job queue, the barrier preventing assignment of an object before the barrier prior to completing operations on each object after the barrier;

one or more processors executing the plurality of job executors to perform parallel actions on the assigned objects, wherein the parallel actions include at least one of replication and migration of data characterizing the assigned objects;

wherein the plurality of job executors are configured to perform pre-processing on an assigned object when the assigned object has child nodes that have not yet been processed, and to perform post-processing on the assigned object when the assigned object has child nodes that have already been processed; and a trigger tracker, coupled in communication with the plurality of job executors, the trigger tracker configured to, responsive to adding one of the one or more sets of objects to the job queue, is configured to increment a respective one of one or more counts associated with an object in accordance with a number of child nodes associated with a respective common parent node represented by the object.

15. The system of claim 14, wherein the plurality of job executors are configured to perform parallel actions on objects representative of child nodes stemming from another object.

16. The system of claim 14, wherein the job queue is configured to detect that each of the plurality of job executors is awaiting an assignment from the job queue, and assigns the objects to the plurality of job executors before adding additional sets of objects to the job queue.

17. The system of claim 14, wherein the job queue is configured to detect that each of the plurality of job executors has a set of objects to add to the job queue, and adds each set to the job queue before assigning additional objects.

18. The system of claim 14, wherein the plurality of job executors are configured to request information for generating a set of objects through a network.

19. The system of claim 14, wherein the plurality of job executors are configured to perform parallel actions through a network.

20. The system of claim 14, wherein the parallel actions include replication of nodes represented by the assigned objects.

21. The system of claim 14, wherein the parallel actions are part of one or more of a namespace replication and a namespace migration.

22. The system of claim 14, wherein the parallel actions are part of a snapshot application.

23. The system of claim 14, wherein the parallel actions are part of a data replication.

24. The system of claim 14, wherein the parallel actions are part of a namespace migration.

25. The system of claim 14, wherein the plurality of job executors comprises a plurality of threads.

26. The system of claim 14, wherein the trigger tracker, responsive to assigning an object representing one of the child nodes associated with the common parent node to one of the plurality of job executors, is configured to decrement the count.

* * * * *